(12) United States Patent
Lindskog et al.

(10) Patent No.: US 9,565,356 B2
(45) Date of Patent: Feb. 7, 2017

(54) OPTIMIZING CAPTURE OF FOCUS STACKS

(71) Applicant: Apple Inc., Cupertino, CA (US)

(72) Inventors: Alexander Lindskog, Santa Clara, CA (US); Frank Doepke, San Jose, CA (US); Ralf Brunner, Cupertino, CA (US); Thomas E. Bishop, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/864,565

(22) Filed: Sep. 24, 2015

(65) Prior Publication Data

US 2016/0360091 A1    Dec. 8, 2016

Related U.S. Application Data

(60) Provisional application No. 62/172,138, filed on Jun. 7, 2015.

(51) Int. Cl.
*H04N 5/232* (2006.01)
*G06T 7/00* (2006.01)
*H04N 5/225* (2006.01)
*H04N 5/357* (2011.01)

(52) U.S. Cl.
CPC ......... *H04N 5/23212* (2013.01); *G06T 7/0051* (2013.01); *H04N 5/2254* (2013.01); *H04N 5/23293* (2013.01); *H04N 5/357* (2013.01)

(58) Field of Classification Search
CPC H04N 5/23212; H04N 5/23293; H04N 5/357; G03B 13/36
USPC .......................................................... 348/349
See application file for complete search history.

(56) References Cited

U.S. PATENT DOCUMENTS

| | | | |
|---|---|---|---|
| 9,438,785 B2* | 9/2016 | Tseng | H04N 5/23212 |
| 2012/0098947 A1* | 4/2012 | Wilkes | H04N 5/23212 348/65 |
| 2013/0235252 A1* | 9/2013 | Tseng | H04N 5/23212 348/349 |

* cited by examiner

*Primary Examiner* — Antoinette Spinks
(74) *Attorney, Agent, or Firm* — Blank Rome LLP

(57) ABSTRACT

Generating a focus stack, including receiving initial focus data that identifies a plurality of target depths, positioning a lens at a first position to capture a first image at a first target depth of the plurality of target depths, determining, in response to capturing the first image and prior to capturing additional images, a sharpness metric for the first image, capturing, in response to determining that the sharpness metric for the first image is an unacceptable value, a second image at a second position based on the sharpness metric, wherein the second position is not included in the plurality of target depths, determining that a sharpness metric for the second image is an acceptable value, and generating a focus stack using the second image.

21 Claims, 4 Drawing Sheets

OPTIMIZING CAPTURE OF FOCUS STACKS

BACKGROUND

This disclosure relates generally to the field of digital image capture and processing, and more particularly to the field of optimizing capture of focus stacks. A camera can adjust a lens stack to obtain focus on an object. A camera's autofocus (AF) system, for example, can automatically adjust the lens stack to obtain focus on a subject. A particular image may have several objects that should be in focus.

Focus stacking combines multiple images having different points of focus to create a final image with better overall focus than the individual images. Sweeping the lens stack from macro to infinity is required in order to ensure that all points in the scene are captured in focus. For example, a camera may capture images with a lens stack at a series of predetermined depths. At each depth, a different portion of the image may be in focus. By combining the various images into a focus stack, the final image will have multiple points of focus.

By its very nature the use of focus stacks requires capturing multiple images, resulting in a tradeoff between frame capture and performance. With a low number of frames, there may be parts of the scene that are not captured in focus, however processing power will be optimal. Conversely, a better result requires the capture of more frames to ensure that all parts of the scene can be captured in focus. However, the more images that are captured, the more processing power is required and memory to store the various images for processing.

SUMMARY

In one embodiment, a method for optimized capture of focus stacks is described. The method includes receiving initial focus data that identifies target depths; positioning a lens at a first position to capture a first image at a first target depth; determining, in response to capturing the first image and prior to capturing additional images, a sharpness metric for the first image; capturing, in response to determining that the sharpness metric for the first image is an unacceptable value, a second image at a second position based on the sharpness metric, wherein the second position is not associated with any of the target depths; determining that a sharpness metric for the second image is an acceptable value; and generating a focus stack using the second image.

In another embodiment, the method may be embodied in computer executable program code and stored in a non-transitory storage device. In yet another embodiment, the method may be implemented in an electronic device having image capture capabilities.

DETAILED DESCRIPTION

Figure 1:
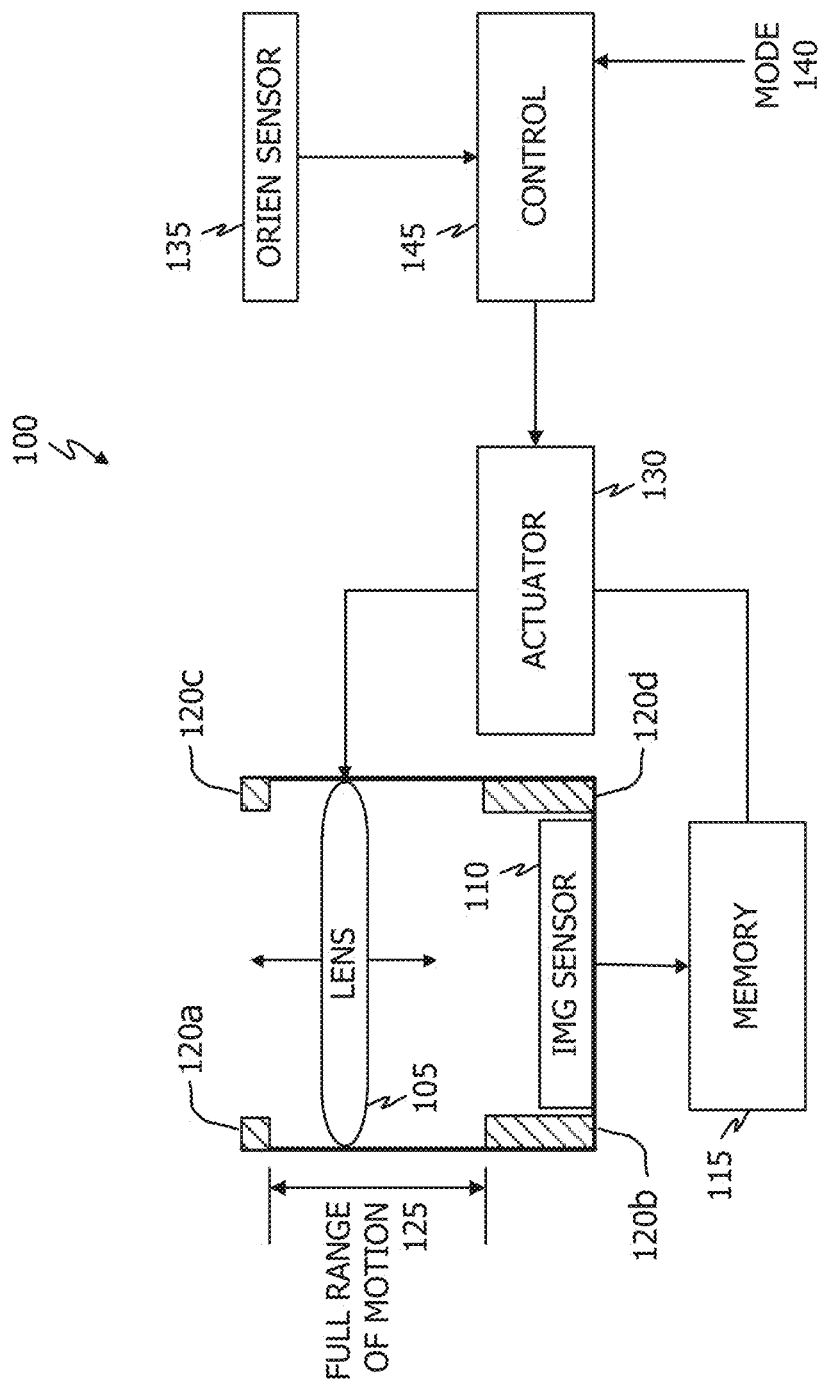
FIG. 1 shows, in block diagram form, a simplified camera system according to one or more embodiments.

This disclosure pertains to systems, methods, and computer readable media for optimizing generation of a focus stack. In general, techniques are disclosed for determining target depths, begin capturing images at the target depths, and concurrently, while capturing the images at the target depths, determining a sharpness metric for each image. If a determined sharpness metric for a particular image is determined to be unsuitable for the focus stack, the lens is repositioned to take another image with the lens positioned slightly closer or farther at which the unsuitable image was captured before continuing to capture images at the target depths. More particularly, in one or more embodiments, a focus stack is generated by receiving initial focus stack data that identifies target depths, positioning a lens at a first position to capture a first image at a first target depth, determining, in response to the capturing, a sharpness metric based on the first image, capturing a second image at a second position based on the sharpness metric, and generating a focus stack using the second image. Further, in one or more embodiments, after the first image is captured, and in response to determining that the sharpness metric for the second image is acceptable, the lens is positioned at a second target depth of the determined target depths, and a third image is captured at the second target depth.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses, which may be moved to various positions to capture images at multiple depths and, as a result, multiple points of focus. As such, the term lens can mean a single optical element or multiple elements configured into a stack or other arrangement.

For purposes of this disclosure, the term "focus stack" may describe images capturing a same object, where each image is captured with the lens at a different focus distance.

Referring to FIG. 1, a simplified block diagram of camera system 100 is depicted, in accordance with one or more embodiments of the disclosure. Camera system 100 may be part of a camera, such as a digital camera. Camera system 100 may also be part of a multifunctional device, such as a mobile phone, tablet computer, personal digital assistant, portable music/video player, or any other electronic device that includes a camera system.

Camera system 100 may include a lens 105. More specifically, as described above, lens 105 may actually include a lens assembly, which may include a number of optical lenses, each with various lens characteristics. For example, each lens may include its own physical imperfections that impact the quality of an image captured by the particular lens. When multiple lenses are combined, for example in the case of a compound lens, the various physical characteristics of the lenses may impact the characteristics of images captured through the lens assembly, such as focal points.

As depicted in FIG. 1, camera system 100 may also include an image sensor 110. Image sensor 110 may be a sensor that detects and conveys the information that constitutes an image. Light may flow through the lens 105 prior to being detected by image sensor 110 and be stored, for example, in memory 115.

In one or more embodiments, the camera system 100 may also include mechanical stops 120 (120a, 120b, 120c, and 120d). The various mechanical stops 120 may delineate the full range of motion 125 within which the lens 105 may move to capture images at various positions. In one or more embodiments, mechanical stops 120b and 120d represent macro stops, and mechanical stops 120a and 120c represent infinity stops. The lens 105 may be moved within the full range of motion 125 to capture images at various distances between the macro stops and the infinity stops. Capturing images at different lens positions may result in various images with different points of focus, or with various points in the scene being more or less in focus. Thus, depending on the position of the lens when images are captured, different objects in the image, or portions of the image, may appear to be in focus. In one or more embodiments, actuator 130 displaces the lens 105 between mechanical stops 120. In one or more embodiments, the camera system may include more than one camera, each including its own lens apparatus, mechanical stops, and the like.

Also included in camera system 100 is an orientation sensor 135 and mode select input 140, both of which supply input to control unit 145. In one embodiment, an image capture device may use a charged coupled device (or a complementary metal-oxide semiconductor as image sensor 110), an electro-mechanical unit (e.g., a voice coil motor) as actuator 130 and an accelerometer as orientation sensor 135.

Figure 2:
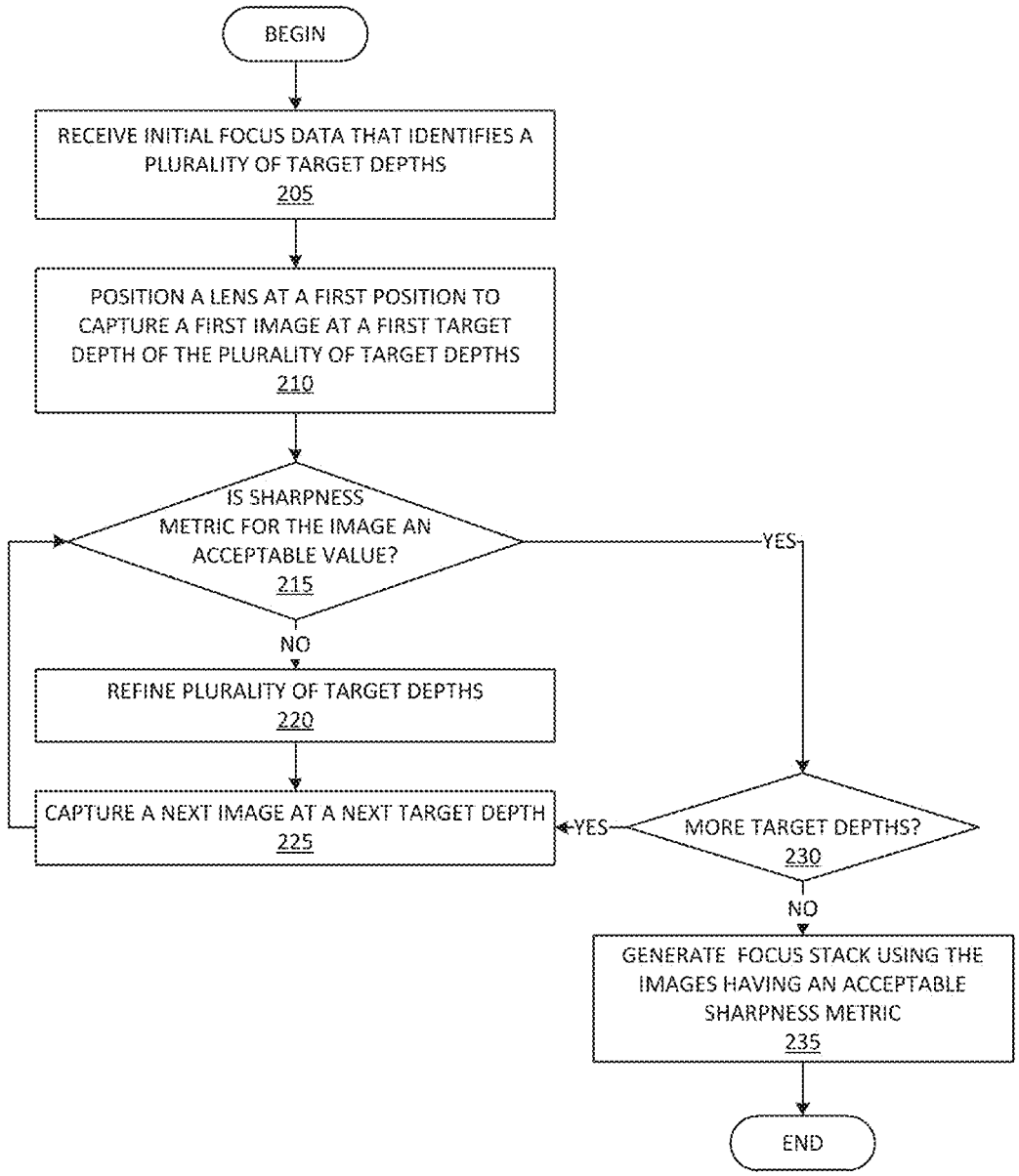
FIG. 2 shows, in flow chart form, a focus stack operation in accordance with one or more embodiments.

Turning to FIG. 2, an example method for generating a focus stack is depicted in the form of a flow chart. The flow chart begins at 205 where the image capture system receives initial focus data that identifies suitable target depths, or focus distances. The target depths may include an estimation of the most important depths in a scene at which a limited number of images should be captured. In one or more embodiments, the initial focus data may be received in the form of a depth map. Further, in one or more embodiments, the focus data may be obtained during an autofocus operation, or may be received using a sensor during a preview mode. In one or more embodiments, the initial focus data may be received using hardware intended to measure distances to an object in a scene, such as a laser range finder, or stereo cameras which may be matched (two cameras having identical focal lengths) or unmatched (two cameras having different focal lengths such as, for example, a wide-angle lens/camera and a telephoto lens/camera). Further, receiving the initial focus data may include a phase detect portion. The phase detect portion may provide a rough estimation for how to move the lens into focus for one or more points of interest in the scene. For example, during the phase detect portion, the control 145 may identify approximately what focus stop or stops will provide an image with one or more objects of interest in focus.

The flow chart continues at 210, and the lens (or one of the available lenses) is positioned at a first target depth to capture a first image. For example, referring to FIG. 1, the actuator 130 may move the lens 105 to a position associated with the first target depth identified in the initial focus data. The image may be captured using the image sensor 110 and stored in the memory 115.

The flow chart continues at 215 and a determination is made regarding whether a sharpness metric for the image is an acceptable value. In one or more embodiments, the sharpness metric is determined by analyzing the image to detect edges and determining the sharpness of the detected edges. That is, in one or more embodiments, the sharpness metric is determined by analyzing edge strength of the image or in one or more portions of the image. For example, a set of filters may be applied to the image to determine the strength of the edges. The sharpness metric may be represented as a numerical value, or by any other means that identifies the sharpness or relative sharpness of the image or designate portion thereof. Determining whether the sharpness metric for the image is an acceptable value may include comparing the determined sharpness metric to a predefined sharpness threshold. For example, a particular sharpness may be required to be used in generating the focus stack. The required sharpness may be expressed in the form of a calculated number, or in the form of a particular step on a scale. In addition, the sharpness required may be modified or recalculated at run time, based on characteristics of the image capture system, or environmental factors, for example. In one or more embodiments, the sharpness metric may be compared to the sharpness threshold to determine if the image is acceptable for including in the focus stack.

In one or more embodiments, the sharpness metric may also be determined based on a comparison of characteristics between a current image and previously captured images at different target depths. For example, the various techniques used to determine initial focus data, such as stereo cameras and phase detect information, may be evaluated at each image.

If at 215 it is determined that the sharpness metric is not an acceptable value, then the flow chart continues at 220, and the plurality of target depths is refined. For example, if the sharpness metric indicates that the edges are not sufficiently sharp, then the lens may be moved to a new position that may be slightly closer or farther than the first position in order to capture another image prior to moving on to the next target depth. In one or more embodiments, phase detect information or stereo camera information may be captured with each image, and an analysis of the information between images during a sweep of the target depths may indicate which direction to move the lens. In addition, the phase detect information may also indicate a distance to the next new target depth.

In one or more embodiments, the sharpness metric may be calculated on the fly while the lens is in motion. For example, while the lens 105 is in motion from the first target depth to the second target depth, the control 145 may determine that a sharpness metric for the first image is insufficient. In response, the lens 105 may be repositioned to capture another image closer to the depth of the first image in order to obtain an image with better sharpness for that target depth. Thus, while the lens is moving from a first target depth to a second target depth, it may be determined that the image captured at the first target depth is not sufficiently sharp, and another image should be captured nearer, but slightly off of the first target depth. Thus, at 220, the plurality of target depths is refined, and the lens returns near the first target depth to capture one or more additional images to ensure that an image representing the first target depth is captured with sufficient sharpness for the focus stack prior to the lens continuing on to the next target depth.

After a captured image is considered to have an acceptable sharpness metric value at 215, the flow chart continues to 230. At 230 a determination is made regarding whether there are additional target depths in the plurality of target depths. In one or more embodiments, if it is determined that there are additional target depths identified either in the initial focus data, or in a refined plurality of target depths, then the flow chart continues at 225 and a next image is captured at a next target depth. In one or more embodiments, the lens may be repositioned to the next target depth in response to capturing a last image at a last target depth. The flow chart continues at 215 and a determination is made regarding whether a sharpness metric for the image is an acceptable value. If at 215 it is determined that the sharpness metric is not an acceptable value, the flow chart continues at 220, and the plurality of target depths is refined. Then at 225, a next image is captured at a next target depth. The actions depicted in 215, 220, and 225 may be repeated until the sharpness metric is deemed acceptable.

When the image is considered to have an acceptable sharpness metric value at 215, and at 230 it is determined that there are no more target depths, the method continues at 235. At 235, the focus stack is generated using the images for which the sharpness metric was deemed acceptable at 215. The result is a collection of images (a focus stack), each having a different focus depth. In one or more embodiments, the focus stack may be utilized to generate an all-focused image, in which a single image includes various depths of focus. In one or more embodiments, the focus stack may also be used to generate a depth map using Depth From Focus (DFF). Specifically, in one or more embodiments, optimizing the capture of images with different focus may allow a better depth map to be obtained using a lower number of images.

It should be understood that the various components of the flow chart described above may be performed in a different order or simultaneously, and some components may even be omitted in one or more embodiments.

Figure 3:
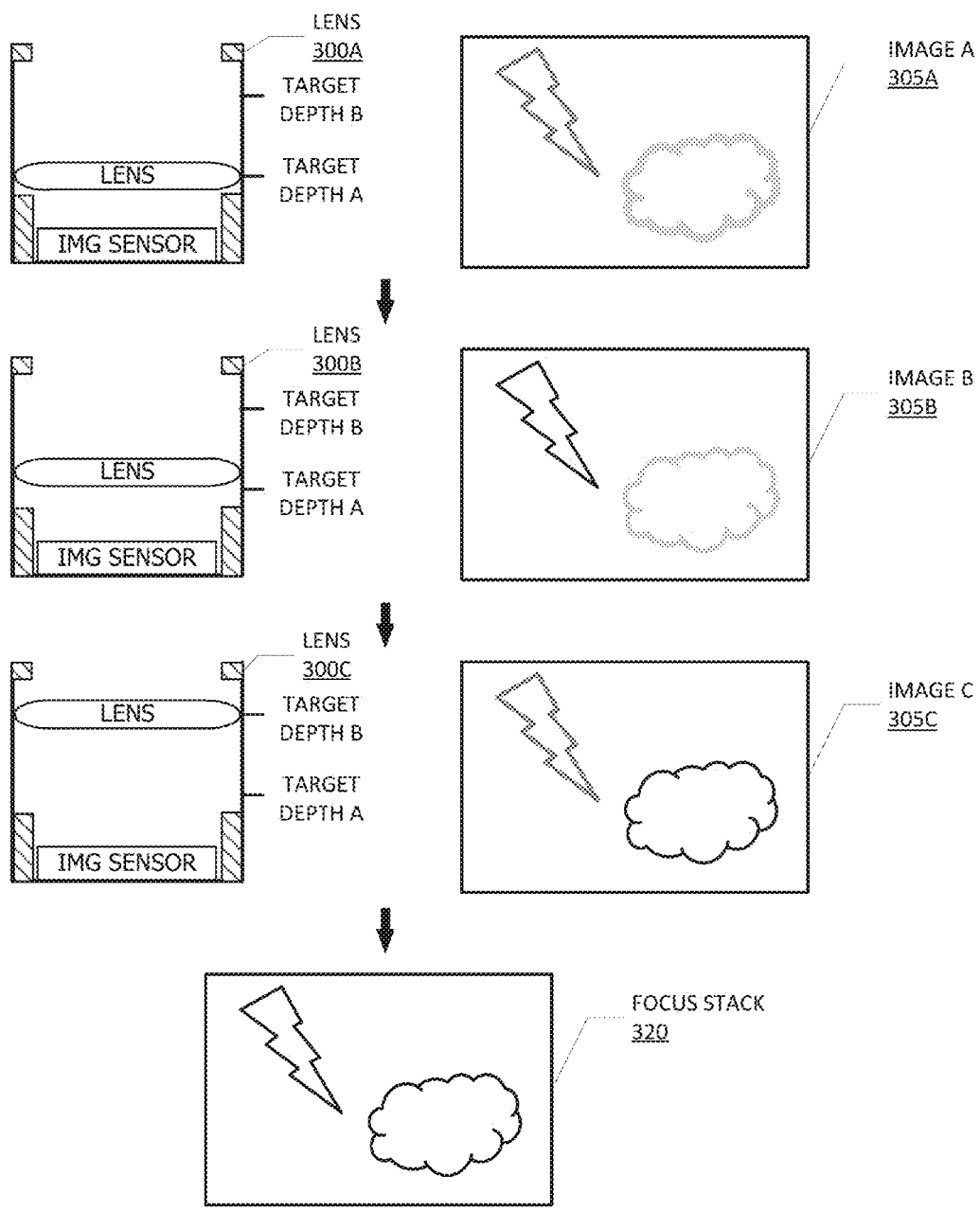
FIG. 3 shows an example flow diagram illustrating various steps taken in optimizing capture of a focus stack in accordance with one or more embodiments.

Referring now to FIG. 3, an example flow diagram depicting a lens system 300 at various positions, along with an example image 305 captured at each position. It should be understood that the example shown in FIG. 3 is depicted merely for purposes of clarity, and is not intended to limit the disclosure. For purposes of this example, initial focus data indicates two target depths: target depth A and target depth B. In one or more embodiments, the target depths may be determined prior to capturing the images, for example during an autofocus procedure, or from a focus map, or during some other preliminary measurement.

The flow diagram begins with Lens System 300a capturing image 305a at target depth A. In the example, the captured scene includes a cloud and a lightning bolt, where target depth A is intended to capture the lightning bolt in focus. Both are shown in gray scale to indicate that the sharpness is poor. In one or more embodiments, the camera system may calculate a sharpness metric for image 305a to determine that the sharpness metric is unsatisfactory. For example, in one or more embodiments, the camera system may determine that the edge strength of one or more of the components in the scene captured in image A 305a include strong edges. For purposes of the example, a camera system may determine that the sharpness metric for image A 305a is unacceptable. In one or more embodiments, the camera system may calculate the sharpness metric for image A 305a after capturing the image, and while the lens is in motion between target depth A and target depth B.

In response to determining that the sharpness metric for image A 305a is unacceptable, the flow diagram continues to the system depicted as lens system 300b. Specifically, the lens is redirected back toward target depth A to capture image B 305b at a depth slightly closer to infinity than target depth A. The result is that the edge strength of the lightning bolt in image B 305B is much crisper, as depicted by the bold black line.

In response to determining that the sharpness metric for image B 305b is acceptable, the lens is moved to target depth B as depicted in lens system 300c. It should be understood that in one or more embodiments, the lens is moving between the position depicted in lens system 300b and lens system 300c (i.e., target depth B), while the camera system is calculating the sharpness metric for image B 305b and determining that the sharpness metric is acceptable. With lens at target depth B, image C 305c may be captured. As depicted, the lightning bolt is now shown in gray scale to indicate that it is out of focus, and the cloud is depicted with a sharp black line to indicate that it is in focus. The camera system may determine that the sharpness metric for image C 305c is acceptable.

Because the lens has captured images at each target depth, focus stack 320 may be generated. In one or more embodiments, focus stack 320 may be generated, which may be a collection of only the captured images that have an acceptable sharpness metric value (i.e., image B 305b and image C 305c). The result of the optimized capture of images to form focus stack 320, both the cloud and the lightning bolt are depicted in focus in the form of an all-focused image generated from the focus stack, and a minimal number of images were captured.

Figure 4:
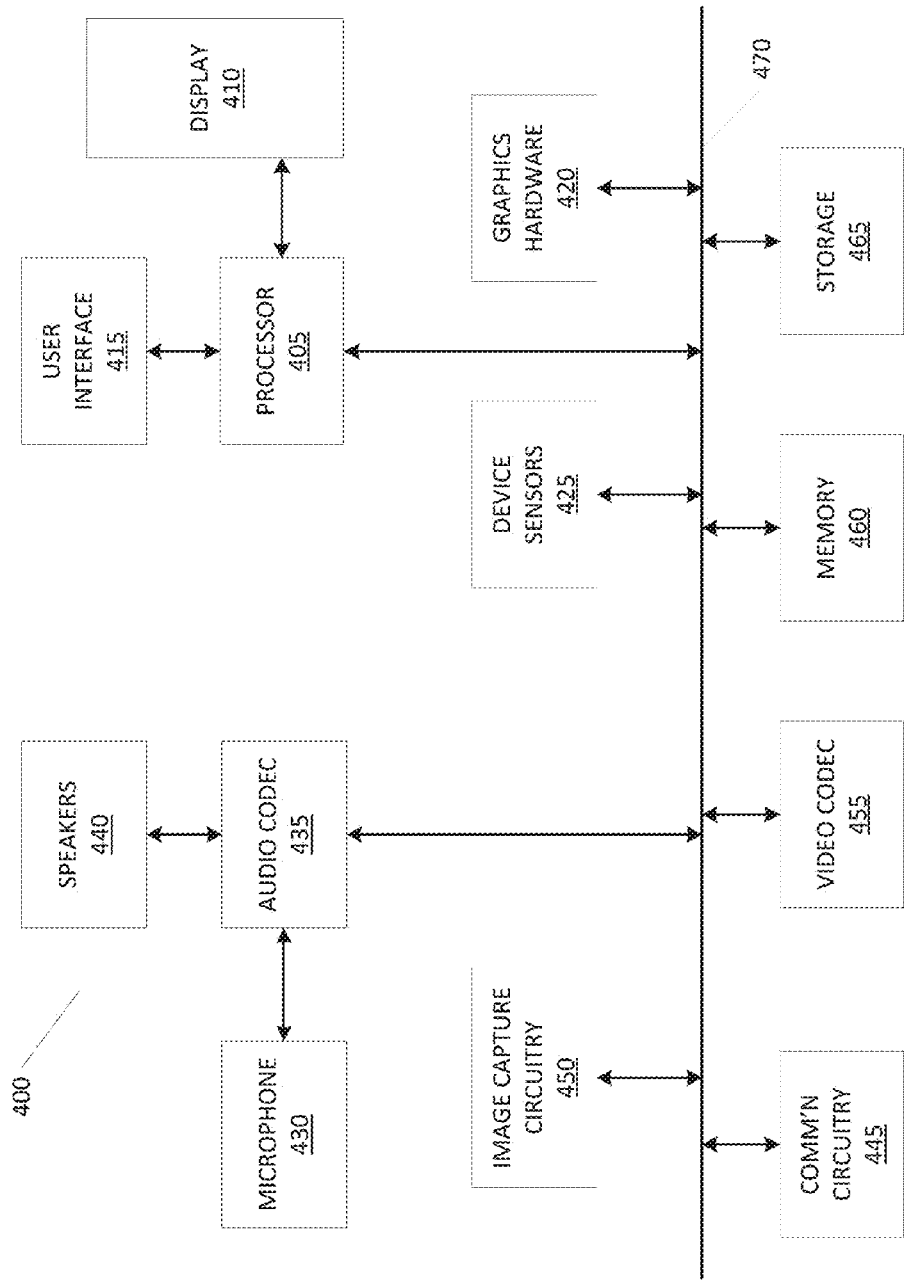
FIG. 4 shows, in block diagram form, a simplified multifunctional device according to one or more embodiments.

Referring now to FIG. 4, a simplified functional block diagram of illustrative multifunction device 400 is shown according to one embodiment. Multifunction electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, digital image capture unit 450 (e.g., including camera system 100) video codec(s) 455 (e.g., in support of digital image capture unit 450), memory 460, storage device 465, and communications bus 470. Multifunction electronic device 400 may be, for example, a digital camera or a personal electronic device such as a personal digital assistant (PDA), personal music player, mobile telephone, or a tablet computer.

Processor 405 may execute instructions necessary to carry out or control the operation of many functions performed by device 400 (e.g., such as the generation and/or processing of images as disclosed herein). Processor 405 may, for instance, drive display 410 and receive user input from user interface 415. User interface 415 may allow a user to interact with device 400. For example, user interface 415 can take a variety of forms, such as a button, keypad, dial, a click wheel, keyboard, display screen and/or a touch screen. Processor 405 may also, for example, be a system-on-chip such as those found in mobile devices and include a dedicated graphics processing unit (GPU). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 to process graphics information. In one embodiment, graphics hardware 420 may include a programmable GPU.

Sensor and camera circuitry 450 may capture still and video images that may be processed in accordance with this disclosure, at least in part, by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405 and graphics hardware 420 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to tangibly retain computer program instructions or code organized into one or more modules and written in any desired computer programming language. When executed by, for example, processor 405 such computer program code may implement one or more of the methods described herein.

In practice, it has been found beneficial to use multiple lens rather than a single lens as suggested above. Thus, lens 105 may be understood to represent a lens assembly that may have, for example, 2 to 7 individual lens elements. Further, entirely different lens systems may be used to capture images used to form a focus stack. By way of example, one lens system may be a telephoto lens system while a second lens system may be a wide-angle lens system. In addition, the number of points-of-interest and the use of a voice coil motor as an actuator are illustrative only. As is the direction of autofocus operations which were described as evaluating points-of-interest from infinity to the closest point at which the image capture device can focus.

Finally, variations of the above-described embodiments may be used in combination with each other. Many other embodiments will be apparent to those of skill in the art upon reviewing the above description. The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of generating a focus stack, comprising:
receiving initial focus data that identifies a plurality of target depths;
positioning a lens at a first position to capture a first image at a first target depth of the plurality of target depths;
determining, in response to capturing the first image and prior to capturing additional images, a sharpness metric for the first image;
capturing, in response to determining that the sharpness metric for the first image is an unacceptable value, a second image at a second position based on the sharpness metric, wherein the second position is not included in the plurality of target depths;
determining that a sharpness metric for the second image is an acceptable value; and
generating a focus stack using the second image.

2. The method of claim 1, further comprising:
positioning, in response to determining that the sharpness metric for the second image is an acceptable value, the lens at a second target depth of the plurality of target depths; and
capturing a third image at the second target depth.

3. The method of claim 1, wherein the sharpness metric is calculated concurrently to moving the lens to a second target depth of the plurality of target depths.

4. The method of claim 1, further comprising, redirecting, in response to calculating the sharpness metric, the lens to the second position to capture the second image based on the sharpness metric, wherein the second position is associated with a new target depth that is not included in the initial focus data.

5. The method of claim 1, further comprising:
generating an all-focused image using the focus stack.

6. The method of claim 1, further comprising:
generating a depth map using the focus stack.

7. The method of claim 1, further comprising:
determining, in response to capturing the second image and prior to capturing additional images, a new sharpness metric based on the second image;
capturing a third image at a third position based on the new sharpness metric; and
modifying the focus stack using the third image.

8. A system for generating a focus stack, comprising:
a lens assembly;
a digital image sensor configured to receive light from the lens assembly; and
a memory operatively coupled to the digital image sensor and comprising computer code configured to cause one or more processors to:
receive initial focus data that identifies a plurality of target depths;
position a lens at a first position to capture a first image at a first target depth of the plurality of target depths;
determine, in response to capturing the first image and prior to capturing additional images, a sharpness metric for the first image;
capture, in response to determining that the sharpness metric for the first image is an unacceptable value, a second image at a second position based on the sharpness metric, wherein the second position is not included in the plurality of target depths;

determining that a sharpness metric for the second image is an acceptable value; and generating a focus stack using the second image.

9. The system of claim 8, the computer code further configured to cause the one or more processors to:

position, in response to determining that the sharpness metric for the second image is an acceptable value, the lens at a second target depth of the plurality of target depths; and capture a third image at the second target depth.

10. The system of claim 8, wherein the sharpness metric is calculated concurrently to moving the lens to a second target depth to capture a second intended image.

11. The system of claim 8, the computer code further configured to cause one or more processors to redirect, in response to calculating the sharpness metric, the lens to the second position to capture the second image based on the sharpness metric, wherein the second position is associated with a new target depth that is not included in the initial focus data.

12. The system of claim 8, wherein the computer code is further configured to cause the one or more processors to generate an all-focused image using the focus stack.

13. The system of claim 8, wherein the computer code is further configured to cause the one or more processors to generate a depth map using the focus stack.

14. The system of claim 8, the computer code further configured to cause one or more processors to:

determine, in response to capturing the second image and prior to capturing additional images, a new sharpness metric based on the second image;

capture a third image at a third position based on the new sharpness metric; and modify the focus stack using the third image.

15. A computer readable medium comprising computer code for generating a focus stack, the computer code executable by one or more processors to:

receive initial focus data that identifies a plurality of target depths;

position a lens at a first position to capture a first image at a first target depth of the plurality of target depths;

determine, in response to capturing the first image and prior to capturing additional images, a sharpness metric for the first image;

capture, in response to determining that the sharpness metric for the first image is an unacceptable value, a second image at a second position based on the sharpness metric, wherein the second position is not included in the plurality of target depths;

determining that a sharpness metric for the second image is an acceptable value; and generating a focus stack using the second image.

16. The computer readable medium of claim 15, the computer code further executable by one or more processors to:

position, in response to determining that the sharpness metric for the second image is an acceptable value, the lens at a second target depth of the plurality of target depths; and capture a third image at the second target depth.

17. The computer readable medium of claim 15, wherein the sharpness metric is calculated concurrently to moving the lens to a second target depth to capture a second intended image.

18. The computer readable medium of claim 15, the computer code further executable by one or more processors to redirect, in response to calculating the sharpness metric, the lens to the second position to capture the second image based on the sharpness metric, wherein the second position is associated with a new target depth that is not included in the plurality of target depths.

19. The computer readable medium of claim 15, the computer code further executable by one or more processors to generate an all-focused image using the focus stack.

20. The computer readable medium of claim 15, the computer code further executable by one or more processors to generate a depth map using the focus stack.

21. The computer readable medium of claim 15, the computer code further executable by the one or more processors to:

determine, in response to capturing the second image and prior to capturing additional images, a new sharpness metric based on the second image;

capture a third image at a third position based on the new sharpness metric; and modify the focus stack using the third image.

* * * * *